Sept. 19, 1944.   F. G. BEETEM   2,358,681
CHARGE CONTROL SYSTEM FOR STORAGE BATTERIES
Filed Jan. 6, 1944
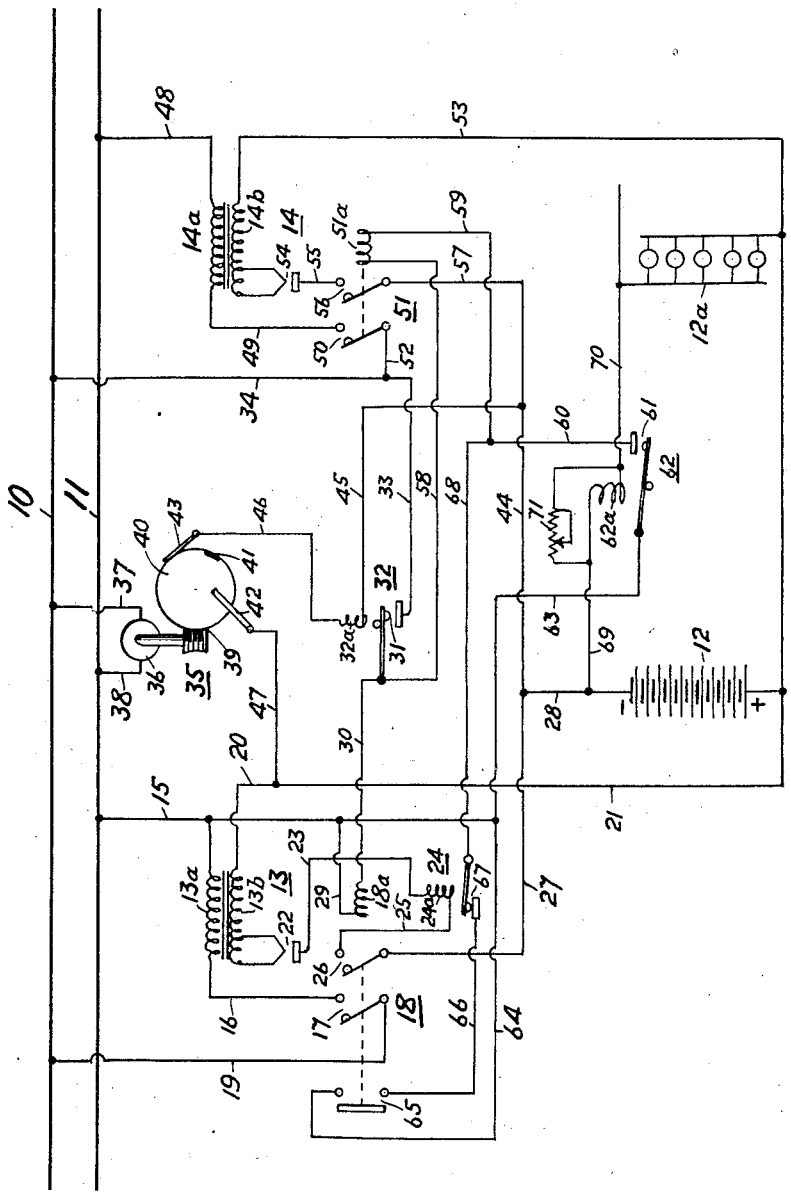
WITNESS:
INVENTOR
Frank G. Beetem
BY
Augustus B. Stoughton.
ATTORNEY Patented Sept. 19, 1944

2,358,681

UNITED STATES PATENT OFFICE 2,358,681

CHARGE CONTROL SYSTEM FOR STORAGE BATTERIES

Frank G. Beetem, Philadelphia, Pa., assignor to The Electric Storage Battery Company, a corporation of New Jersey Application January 6, 1944, Serial No. 517,192

2 Claims. (Cl. 320—11)

This invention relates to systems for controlling the charging of storage batteries; and, more particularly, to systems in which two charging sources are provided whereof one or both are automatically connected for charging the battery, depending upon load conditions.

An object of the invention is to provide such a charging system comprising a storage battery and its load circuit and two charging sources, with means for periodically and at predetermined time intervals establishing the charging circuit for the first charging source if disconnected, means responsive to battery voltage for interrupting said charging circuit, and means responsive to the load conditions for establishing the charging circuit for the second charging source.

Another object of the invention is to provide a charging system as above described including means for establishing the charging circuit of the second charging source independently of the load conditions, should the first charging source fail to function when its charging circuit is established.

Another object of the invention is to provide a charging system as above described including means responsive to a predetermined high battery voltage for interrupting the circuits of whatever charging sources are connected to the battery.

Other objects of the invention will appear from the following description in connection with the accompanying drawing in which the single figure represents diagrammatically an embodiment of the invention.

In the drawing, 10 and 11 are the conductors of an A. C. supply circuit adapted to furnish charging current to the storage battery 12 and its load circuit 12a through the rectifiers 13 and 14, whereof rectifier 13 is arranged and connected to supply charging current to the battery under normal load conditions and rectifier 14 is arranged to supply charging current in parallel with rectifier 13 under unusually heavy load conditions.

Rectifier 13 includes a transformer whose primary coil 13a is connected to A. C. conductor 11 via conductor 15 on the one side and on the other side to A. C. conductor 10 via conductor 16, contacts 17 of contactor 18, and conductor 19. The secondary winding 13b of transformer 13 is connected to the storage battery 12 on the one side via conductors 20 and 21 and on the other side through electronic rectifier 22, conductor 23, coil 24a of contactor 24, conductor 25, contacts 26 of contactor 18 and conductors 27 and 28.

The exciting coil 18a of contactor 18 is connected across the A. C. circuit 10, 11 via conductors 15 and 29, coil 18a, conductor 30, contacts 31 of battery voltage responsive relay 32 and conductors 33 and 34. The circuit of the exciting coil 32a of relay 32 is controlled by the timer 35 which comprises the synchronous motor 36 connected to the A. C. circuit 10, 11 via conductors 37 and 38, said motor driving, by means of the worm gear 39, the electrically conducting disk 40. In the periphery of the disk 40 is an insulating insert 41. The brush 42 makes contact continuously with the conducting disk 40 while the brush 43 bears against the periphery of disk 40 so that once in each revolution of the disk 40 the circuit is interrupted by the insulating insert 41.

The circuit of the exciting coil 32a may be traced from the negative terminal of the battery via conductors 28, 44 and 45, coil 32a, conductor 46, brush 43, disk 40 and brush 42 of timer 35, and conductors 47 and 21 to the positive terminal of the battery.

Rectifier 14 includes a transformer whose primary coil 14a is connected on the one side to A. C. conductor 11 via conductor 48 and on the other side to A. C. conductor 10 via conductor 49, contacts 50 of contactor 51, and conductors 52 and 34. The secondary winding 14b of transformer 14 is connected on the one side by conductor 53 to the positive terminal of the battery 12 and on the other side via rectifier 54, conductor 55, contacts 56 and conductors 57 and 44 to the negative terminal of the battery. The exciting coil 51a of contactor 51 is connected on the one side to A. C. conductor 10 via conductor 58, contacts 31 and conductors 33 and 34 and on the other side to A. C. conductor 11 via conductors 59 and 60, contacts 61 of series load relay 62 and conductors 63 and 15. In shunt across contacts 61 is a circuit comprising conductors 63 and 64, auxiliary contacts 65 of contactor 18, conductor 66, contacts 67 of contactor 24 and conductors 68 and 60.

The exciting coil 62a of series load relay 62 is connected in series between the negative battery terminal and the load circuit 12a via conductors 69 and 70, with an adjustable shunt 71 for adjusting the proportion of the load current passing through coil 62a.

The operation of the apparatus above described is as follows:

So long as the battery voltage is below that for which relay 32 is adjusted to lift its armature, contacts 31 will remain closed and exciting coil 18a will be energized from the A. C. circuit 10, 11 via conductors 15 and 29, coil 18a, conductor 30, contacts 31 and conductors 33 and 34. This will close contacts 17 and 26. The closing of contacts 17 connects the primary windings 13a to the A. C. circuit via conductor 19, contacts 17, conductor 16, winding 13a and conductor 15. The closing of contacts 26 connects the secondary winding 13b to the battery via conductors 21 and 20, winding 13b, rectifier 22, conductor 23, coil 24a, conductor 25, contacts 26 and conductors 27 and 28. The rectifier 13 will therefore be delivering charging current to the battery. This charging current in coil 24a will hold contacts 67 open. When the voltage of the battery increases to a value corresponding to a point on the steep part of the charge-voltage curve near the end of charge, say about 2.3 volts per cell, battery voltage responsive relay 32 will open its contacts, thus opening the exciting circuit of coil 18a and opening the contacts 17 and 26, thereby interrupting the charging current. When, thereafter, the rotation of the timer disk 40 brings the insulating insert 41 under brush 43, the excitation of coil 32a will be interrupted, the contacts 31 will reclose, again closing the exciting circuit of coil 18a and re-establishing the charging circuit. If, prior to this charging period the battery has been subjected to but little discharge, its voltage will promptly rise to the value at which relay 32 operates again to terminate the charge. If, however, the battery has been subjected to considerable discharge as a result of heavy load conditions, a considerable time will elapse before the charging circuit is opened by relay 32. Relay 32 is so designed that after its excitation has increased to a value sufficient to attract its armature and open its contacts 31, a much lower excitation, below that due to the reduced battery voltage resulting from discharge, will be required to release its armature, so that the contacts 31, once opened, will remain open regardless of any normal drop in battery voltage, until the exciting circuit of coil 32a is opened at the timing disk.

Under unusually heavy load conditions, the load may exceed the output of rectifier 13, and the battery will be subjected to a continuous discharge. To meet these conditions, the second rectifier 14 is provided, with means for establishing its charging circuit, comprising the series load relay 62. When the load reaches the value at which the excitation of coil 62a is sufficient to close contacts 61, the exciting circuit of coil 51a will be closed through the circuit from A. C. conductor 10 via conductors 34 and 33, contacts 31, conductor 58, coil 51a, conductors 59 and 60, contacts 61, conductors 63 and 15 to A. C. conductor 11, thus closing contacts 50 and 56. This will connect the primary winding 14a to the A. C. circuit 10, 11, and the secondary winding 14b to the battery through rectifier 54, thus adding the output of rectifier 14 to that of rectifier 13, thereby increasing the charging rate to compensate for the increased load. When, in response to increased battery charge voltage, the contacts 31 of relay 32 are opened, the excitation of both coils 18a and 51a will be interrupted and the charging circuits of both rectifiers 13 and 14 will be disconnected by contactors 18 and 51, respectively.

The second rectifier, 14, is also arranged to perform another function, i. e., to act as a reserve source of charging current, independently of load conditions, should rectifier 13 fail. In case of such failure, rectifier 13 will not deliver its normal output through coil 24a when contactor 18 is closed in response to the opening of the exciting current of coil 32a by the timer 35. Thus contacts 67 will be closed and auxiliary contacts 65 will also be closed, establishing the shunt circuit around contacts 61 of series load relay 62 via conductors 60 and 68, contacts 67, conductor 66, contacts 65 and conductor 64. This will close the exciting circuit of coil 51a, independently of relay 62, thereby closing the contacts of contactor 51 and establishing the charging circuits of rectifier 14. If under these conditions the battery voltage rises by reason of the charging current to a point which opens the contacts 31 of voltage responsive relay 32, the excitation of coils 18a and 51a will be interrupted, the contacts of contactors 18 and 51 will open, thus opening the charging circuits of both rectifiers 13 and 14.

It will be obvious to those skilled in the art to which the invention relates that modifications may be made in details of construction and arrangement without departing from the spirit of the invention which is not limited in respect to such matters or to matters of mere form.

I claim:

1. In a charge control system for a storage battery, the combination with the battery and its load circuit of two paths for the transmission of charging current to the battery whereof the first is normally closed and the second is normally open, means responsive to a predetermined elevated battery voltage for reducing the current through the first of said paths, timing means for periodically nullifying the operation of said reducing means to permit the transmission of full charging current, and means responsive to increase of load on the load circuit for closing the second transmitting path.

2. In a charge control system for a storage battery, the combination with the battery and its load circuit of two paths for the transmission of charging current to the battery whereof the first is normally closed and the second is normally open, means responsive to a predetermined elevated battery voltage for reducing the current through the first of said paths, timing means for periodically nullifying the operation of said reducing means to permit the transmission of full charging current, means responsive to increase of load on the load circuit for closing the second transmitting path, and means controlled by the operation of said timing means and responsive to the failure of said timing means to restore full charge current through said first path for closing the second transmitting path independently of the operation of said load responsive means.

FRANK G. BEETEM.